United States Patent [19]

Mowill

[11] Patent Number: 4,641,495
[45] Date of Patent: Feb. 10, 1987

[54] DUAL ENTRY RADIAL TURBINE GAS GENERATOR

[75] Inventor: R. Jan Mowill, Oslo, Norway

[73] Assignee: A/S Kongsberg Vapenfabrikk, Kongsberg, Norway

[21] Appl. No.: 698,586

[22] Filed: Feb. 5, 1985

[51] Int. Cl.$^4$ .............................................. F02C 3/10
[52] U.S. Cl. .................................. 60/39.161; 60/726; 415/98; 415/199.1
[58] Field of Search ................ 415/93, 98, 100, 101, 415/102, 103, 27, 199.1; 60/39.161, 269, 726

[56] References Cited

U.S. PATENT DOCUMENTS

| | | | |
|---|---|---|---|
| 2,405,919 | 8/1946 | Whittle | 60/269 |
| 2,435,836 | 2/1948 | Johnson | 415/98 |
| 2,470,565 | 5/1949 | Loss | 415/27 |
| 2,578,481 | 12/1951 | Lombard | 415/98 |
| 2,695,499 | 11/1954 | Walker | 60/39.31 |
| 3,625,003 | 9/1970 | Liddle et al. | 60/39.25 |
| 4,251,985 | 2/1981 | Sullivan | 60/39.29 |

OTHER PUBLICATIONS

Garrett publication, "Series 85" (AiResearch Div.).
Thomassen Holland b.n. publication, "TF-10".

*Primary Examiner*—Louis J. Casaregola
*Attorney, Agent, or Firm*—Finnegan, Henderson, Farabow, Garrett & Dunner

[57] ABSTRACT

A compact, highly efficient single spool gas turbine gas generator uses a double-entry centrifugal first stage compressor, a single-entry centrifugal second stage compressor, and a radial inflow turbine to achieve an overall pressure ratio of greater than 15:1. The first stage pressure ratio is more than twice the second stage pressure ratio, and the first stage entrance Mach numbers are greater than about 1.4. The specific speed of each the compressors ranges from 0.65 to 0.85, and of the turbine from 0.50 to 0.75.

26 Claims, 4 Drawing Figures

DUAL ENTRY RADIAL TURBINE GAS GENERATOR

BACKGROUND

1. Field of the Invention

This invention relates to high performance gas turbine gas generators using centrifugal compressors and radial inflow turbines, the gas generators providing a high efficiency in terms of specific fuel consumption.

2. Description of the Prior Art

There is a demonstrated need for gas turbine power plants as alternatives for diesel engines, for instance, for vehicular and other applications where a compact, lightweight engine having low specific fuel consumption (sfc) is required. Practical experience has shown that substantial space and weight savings are available using conventional gas turbines. However, the worsening of specific fuel consumption in simple cycle engines as rated power diminishes has been an accepted fact and a major drawback in prior art devices.

Prior attempts to provide gas turbine power plants have used many different configurations embodying centrifugal and radial components. For example, a known gas turbine auxiliary power unit (APU) includes a double-entry, low pressure centrifugal compressor stage and a single-entry, high pressure centrifugal compressor stage operating in series to provide compressed air both for combustion with fuel in a combustor and bleed air for external use. The hot gases from the combustor are then fed to a single stage radial inflow turbine which drives both compressors and, in addition, provides shaft power takeoff for external use in a manner consistent with a single shaft engine.

The previous inability to provide sufficient pressure ratio at acceptable component efficiencies has resulted in small power plants with low pressure ratios (i.e., less than about 12:1) with specific ic fuel consumptions substantially higher than high speed diesel engines of comparable power. In an effort to overcome these limitations, the industry has typically used one or more axial compressor stages upstream of a final centrifugal compressor stage, or two single-entry centrifugal stages, together with a conventional axial turbine for the gas generator section of the engine. For the best state-of-the-art 1000 hp gas turbine engine designs with either of these configurations, the industry currently would expect an sfc of about 0.45 at an overall pressure ratio of less than about 15:1.

SUMMARY OF THE INVENTION

As a consequence of the above shortcomings in conventional gas turbine gas generator systems, it is an object of the present invention to provide a high pressure ratio gas turbine gas generator utilizing a radial inflow turbine to drive matched centrifugal compressor components on the same shaft.

It is also an object of the present invention to provide a gas turbine gas generator having a specific fuel consumption comparable to diesel engines while maintaining a simple cycle construction (i.e., no recuperator/regenerator).

It is yet a further object of the present invention to provide a high pressure ratio gas turbine gas generator particularly suitable for applications of relatively low power (typically less than 4000 hp) and using only two compressor stages.

The aforesaid worsening of specific fuel consumption in small size gas turbine engines of the prior art has, through the present invention to be discussed in more detail below, been changed so that big engine efficiency can now be had in small turbine engines, thus enabling simple cycle gas turbine engines to compete in fuel consumption with high speed diesel engines, even down to less than 1000 hp. The present invention thus constitutes a step function in the art as evidenced by the conventional configurations employed by all gas turbine companies in their new engine developments.

The present invention generally includes a gas turbine gas generator flow path configuration which is characterized by the following components in the sequence of the airflow (see FIG. 1):

1. Double-entry centrifugal compressor of essentially radial flow, as the first stage.
2. Single-entry centrifugal compressor as the second stage.
3. Radial inflow turbine as the gas generator turbine.

The cycle according to the present invention utilizes a substantially higher pressure ratio than conventional gas turbine engines, particularly as it applies to engines in the lower power range, for example under 4000 hp. Since pressure ratio is one of the important factors contributing to efficiency, the cycle according to the invention will provide higher thermal efficiencies than existing turbine engines in the lower power range.

Another important feature of the gas generator according to the present invention is a "matching" of the first and second compressor stages in terms of specific speeds in part by deliberately adjusting the split in the pressure ratio between the first and second stages. The use of a radial inflow turbine to directly drive these matched compressor stages in a "single spool" arrangement, whereby the turbine, first stage compressor, and second stage compressor all rotate at the same angular speed, results in at least three distinct advantages. First, the mechanical strength of the radial inflow turbine is sufficient to allow operation of each of the centrifugal compressor stages at near optimum level in terms of specific speed resulting in an optimized overall compressor component. Second, the radial inflow turbine working under these conditions surprisingly operates at near its own optimum specific speed, resulting in an optimized gas generator. Third, the resulting high peripheral speed of the radial inflow turbine results in a lowering of the stagnation temperature of the hot combustion gases impinging on the turbine blades. As a consequence, the turbine inlet temperatures can be raised to further increase thermal efficiency or the turbine component operating lifetime can be extended.

In accordance with the present invention, as broadly described herein, the compact, high efficiency gas turbine gas generator comprises compressor means for providing an overall pressure ratio of greater than about 15:1. The compressor means includes a first stage, double-entry centrifugal air compressor having a pair of entrances and a common exit; a second stage, single-entry centrifugal air compressor positioned adjacent to the first stage compressor and having an entrance that is flow-connected to the first stage common exit, and also having a second stage exit; and a shaft assembly for mechanically interconnecting the first and second stages for rotation at the same angular speed. The gas generator also includes combustor means operatively connected to the second stage exit for receiving the compressed air and for combusting fuel using the compressed air to generate combustion gases. Still further, the gas generator utilizes a single stage radial inflow turbine having an inlet and an outlet, the turbine being operatively connected directly to the shaft assembly drive and also being flow connected to the combustor means for receiving at the turbine inlet, and partially expanding, the combustion gases to drive the first and the second compressor stages. Exhaust means are flow connected to the turbine outlet for ducting the partially expanded combustion gases for further work-producing expansion. Importantly, the pressure ratio of the first compressor stage is greater than about twice the pressure ratio of the second compressor stage; the entrance Mach numbers of the first stage, double-entry compressor are greater than about 1.4; and the specific speeds of the first and second compressor stages are each close to their optimum value and are each greater than about 0.60.

Preferably, the gas generator overall pressure ratio across the first and second compressor stages is greater than about 20:1, and the first compressor stage pressure ratio is between about 6:1 and about 9:1, while the second compressor stage pressure ratio is between about 2:1 and about 4:1.

It is further preferred that the specific speeds of each compressor stage range from about 0.65–0.80, and that, concurrently, the specific speed of the turbine component ranges from about 0.5–0.75, whereby the efficiencies of both the compressor means and the turbine are near their peak values.

It is still further preferred that during steady state operation substantially all of the compressed air exiting said first stage is received by said second stage compressor, and substantially all of the compressed air leaving the second stage compressor is received by the combustor.

Also, the single spool, two-stage high performance compressor unit of the present invention, as broadly described herein, comprises a double-entry centrifugal compressor first stage; a single-entry centrigugal compressor second stage, the second stage compressor being operatively connected to receive gas exiting the first stage compressor; and a shaft assembly for coaxially mounting both the first stage and the second stage compressor for dependent rotation at the same speed. The overall pressure ratio across the compressor unit is greater than about 15:1; the pressure ratio across the first compressor stage is greater than about twice the pressure ratio across the second compressor stage; and the specific speed of each of the first and second stage compressors is greater than about 0.60.

Preferably, the compressor unit further includes a single stage radial inflow turbine being mounted on the shaft assembly for driving both the first stage and the second stage compressors at the same speed, and the specific speed of the turbine is in the range from about 0.50 to about 0.75.

The accompanying drawings which are incorporated in and constitutes a part of this specification, illustrate one embodiment of the invention and, together with the description, serve to explain the principles of the invention.

Figures 1, 1A:
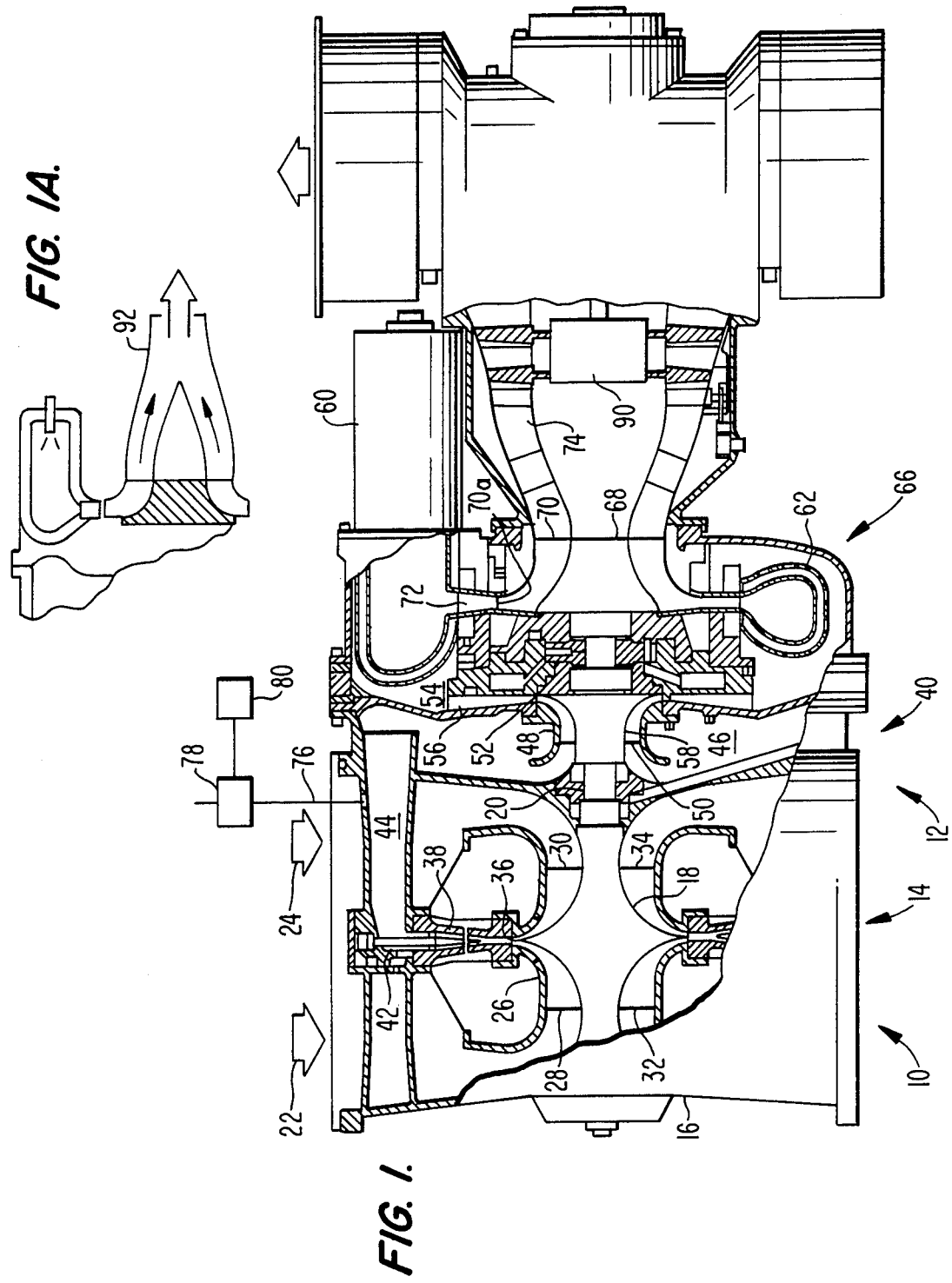
FIG. 1 is a schematic cross-sectional view of a gas turbine gas generator in accordance with the present invention.

Reference will now be made in detail to the present preferred embodiment of the invention which is illustrated in the accompanying drawings.

DESCRIPTION OF THE PREFERRED EMBODIMENT

In accordance with the present invention, the gas generator of the present invention includes compressor means for providing an overall pressure ratio of greater than about 15:1 and having a double-entry centrifugal low pressure first stage with a pair of entrances and a single exit. As embodied herein and depicted in FIG. 1, there is shown a preferred embodiment of the present invention in the form of a gas turbine gas generator designated generally by 10 with compressor means 12 including low pressure, first compressor stage 14. First compressor stage 14 includes double-entry compressor module 16 having a compressor rotor 18 mounted for rotation by shaft assembly 20 and with twin, axially-opposed flow paths designated by arrows 22, 24, respectively. First compressor stage 14 also includes surrounding housing 26 which defines a pair of flow-symmetric, axially opposed entrances 28, 30 for directing air to compressor blade assemblies 32, 34 on rotor 18. Co-pending application Ser. No. 577,359 discloses an improved double-entry compressor especially suited for this application.

Double-entry compressor module 16 has a single, annular, radially directed compressor exit 36 operatively connected to a diffuser assembly 38. Diffuser assembly 38 receives the high velocity air from exit 36 and converts the high velocity air to higher pressure, low velocity air for ultimate transmission to high pressure compressor stage 40 and then to combustor 60. Diffuser assembly 38 could be replaced by a manifold assembly (not shown) designed to preserve a portion of the dynamic head of the air leaving exit 36. Co-pending application Ser. No. 577,383 discloses a variable geometry diffuser apparatus which advantageously could be used in diffuser assembly 38.

With continued reference to FIG. 1, diffuser assembly 38 is provided with an annular plenum 42 for collecting the diffused air. For the embodiment shown in FIG. 1, plenum 42 is flow-connected with cross-over duct 44 which, in turn, is flow-connected with the inlet plenum 46 of high pressure compressor stage 40 to be discussed in more detail hereinafter. Other cross-over duct arrangements can be utilized including the construction detailed in co-pending application Ser. No. 610,580, which construction offers additional structural and component performance benefits.

Also in accordance with the present invention, the compressor means includes a high pressure centrifugal compressor second stage positioned adjacent to the first stage compressor and having a single entrance and a single exit. As embodied herein and as shown in FIG. 1, compressor means 12 further includes high pressure compressor stage 40 which is a single-entry radial compressor having a housing 48 defining compressor entrance 50 for receiving compressed air from inlet plenum 46. The high pressure compressor housing 48 also defines second stage compressor exit 52 in flow communication with the combustor supply plenum 54 through second stage diffuser assembly 56. High pressure compressor rotor 58 is positioned within housing 48 and is mounted for rotation on shaft assembly 20. Thus, the compressed air flow path proceeds from the collection plenum 42 of the double-entry compressor module 16, through cross-over duct 44, to the high pressure compressor stage inlet plenum 46, past high pressure compressor rotor 58 and into combustor supply plenum 54.

Further in accordance with the present invention, the pressure ratios of the first and second compressor stages are selected such that the pressure ratio in the first, low pressure stage is greater than about twice the pressure ratio of the second, high pressure stage. Additionally, the flow path dimensions of the first compressor stage are selected to provide a favorable specific speed consistent with the pressure ratio chosen for that stage, as will be explained in more detail hereinafter. As embodied herein, the overall compression ratio across both first and second compressor stages is greater than about 15:1, with the pressure ratio of first compressor stage 14 ranging from about 6:1 to about 9:1 and second compressor stage 40 pressure ratio ranging from about 2:1 to about 4:1. The relatively low second stage pressure ratio is intended to keep the specific speed (see discussion below) of the second stage as high as possible.

The typical inducer tip relative entrance Mach numbers at first stage compressor entrances 28, 30 are about 1.4 or greater and occur at the outer tips of the leading edges of blades 32, 34 during operation at rated power. Although greater than 1.0 Mach numbers will cause shocks to occur in the compressor inlet, these will be relatively weak, oblique shocks and will not seriously affect overall performance. The present invention stems from a design philosophy where control of specific speed of the compressor components is more important than keeping low inlet Mach numbers. This is a departure from conventional design practice in the art.

The component efficiencies of pumps, compressors and turbines are heavily dependent on the selection of the best so-called specific speed. This is the speed-flow-work relationship which provides the most efficient energy conversion in that particular component. The specific speed ($N_s$) is here defined as follows:

$$N_s = \frac{\omega \sqrt{Q}}{[\Delta H]^{0.75}}$$

where:
$\omega$ = rotational speed, in radians per second
Q = volumetric flow rate, in m$^3$ per second
$\Delta H$ = specific power, in watts/kg/sec It has been found that, in order to satisfy the requirement for favorable specific speeds of both compressor stages at the high pressure ratios of the present invention, the aforementioned pressure ratio split between the first and second compressor stages is critical. Moreover, it both surprising and highly advantageous that the overall compressor section performance allows the radial inflow turbine component to be operated at near its optimum specific speed. This matching is accomplished notwithstanding the use of a single spool arrangement whereby both compressor stages 14 and 40 are driven directly by turbine 66. These conditions provide a highly efficient, high performance simple cycle gas generator such as gas generator 10 shown in FIG. 1.

Further in accordance with the present invention, the gas generator includes combustor means operatively connected to the exit of the second compressor stage for receiving the compressed air and combusting fuel using the compressed air to generate combustion gases. As embodied herein, two can combustors 60 are provided in flow-communication with plenum 54 through double-walled turbine inlet manifold 62 (only a single combustor is shown in FIG. 1). Any number of combustors can be used and also combustors of non-circular cross-section such as shown in co-pending application Ser. No. 610,585. Preferably, during steady state operation, all the compressed air exiting second compressor stage 40, except that used for cooling or sealing purposes, is channeled to combustor 60 via plenum 54 and between the walls of manifold 62.

Still further in accordance with the present invention, the gas generator includes a single stage radial inflow turbine having an inlet and an outlet. The turbine is operatively connected to directly drive the shaft assembly on which the compressor stages are mounted, and is also flow connected to the combustor means for receiving at the turbine inlet, and partially expanding, the combustion gases. As embodied herein, gas generator 10 includes radial inflow turbine 66 with turbine rotor 68 having blades 70 with blade tips 70a. Turbine 66 receives the hot combustion gases from combustor 60 through turbine inlet nozzle assembly 72 via turbine inlet manifold 62. Turbine rotor 68 is directly coupled to shaft assembly 20 to rotate both rotor 58 of high pressure compressor stage 40 and rotor 18 of low pressure compressor stage 14. Co-pending application Ser. No. 610,580 provides details of apparatus especially suited for shaft assembly 20.

Still further in accordance with the present invention, the gas generator includes exhaust means flow connected to the turbine outlet for ducting the partially expanded combustion gases for further external work-producing expansion. As embodied herein, gas generator 10 includes manifold 74 operatively connected to receive the partially expanded combustion gases from turbine 66 for ducting, e.q., to downstream free power turbine unit 90 or free-jet propulsion apparatus 92, (FIG. 1A), to provide further work-producing expansion of the combustion gases exhausted from turbine 66. Free power turbine unit 90 can have one or more individual stages (two stages are shown in FIG. 1).

Figure 2A:
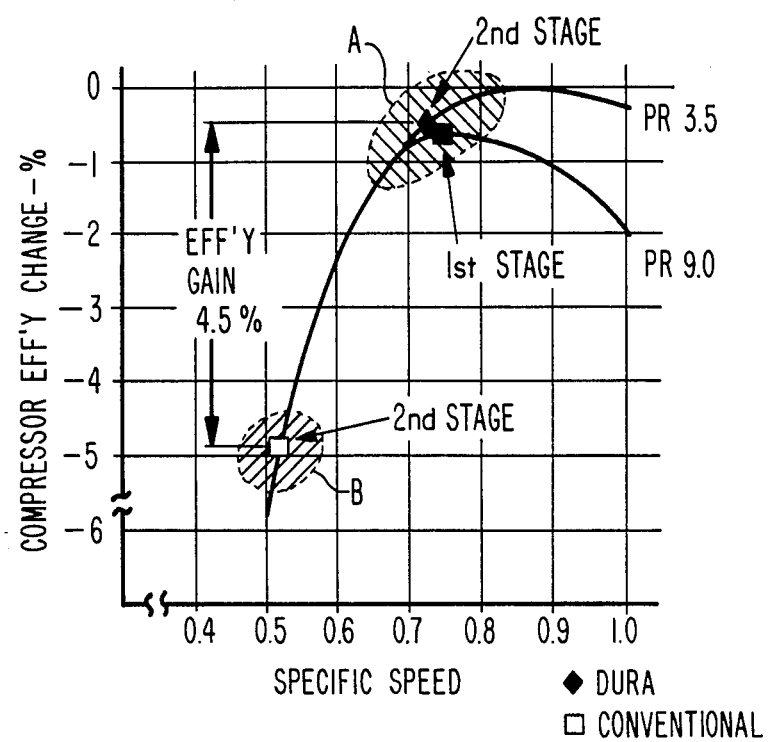
FIGS. 2A and 2B are schematic graphs showing the improvements in efficiency resulting from use of compressor components and turbine components matched to their specific speeds in a gas generator made in accordance with the present invention.
Figure 2B:
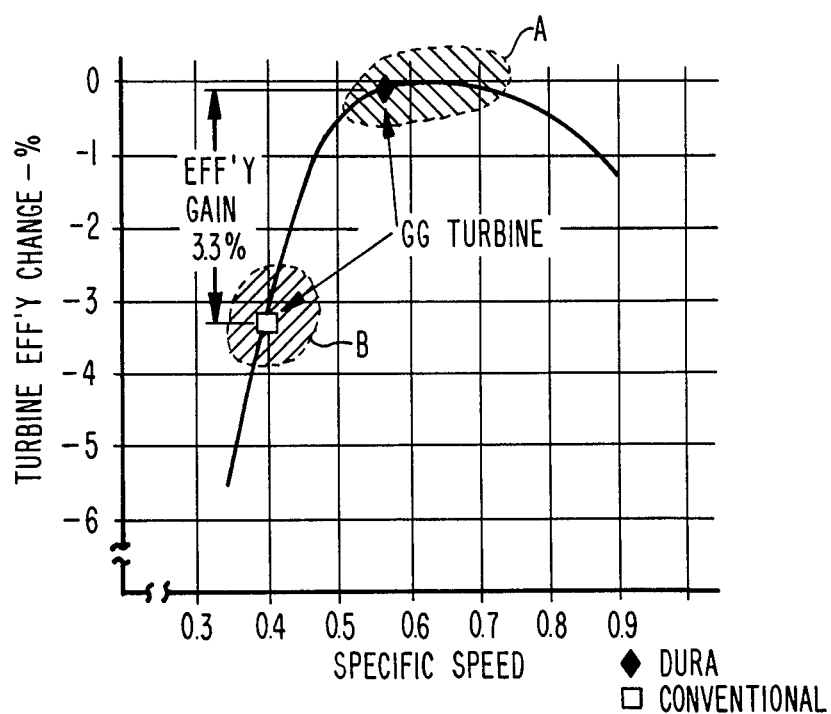

In FIG. 2, the specific speed curves for the two compressor stages and the radial turbine stage of a gas generator designed according to the invention are shown. The gas generator has an overall pressure ratio of greater than 20:1, using a double-entry centrifugal compressor of about 9:1 pressure ratio with inlet Mach number greater than 1.4, and a second stage, single-entry centrifugal compressor of about 3.5:1 pressure ratio (i.e. less than 50% of the pressure ratio of the first stage). As can be seen, the efficiency of the radial inflow turbine peaks near the efficiency peak of the two compressors stages when all are run together on the same shaft as part of a gas generator. This is denoted with regions designated "A" in FIG. 2 which encompass compressor specific speed ranges from about 0.65-0.85 and a radial inflow turbine specific speed range of about 0.50-0.75.

Regions "B" indicate that a second stage centrifugal compressor following one or more axial stages or a single-entry centrifugal compressor, as hypothetical alternative low pressure "first stages" made in accordance with the teachings of prior art high pressure ratio gas generators, would fall well below its optimum range. FIG. 2 also shows that a radial inflow gas generator turbine would fall below its optimum if it had to be matched to a lower specific speed compressor section. Additionally, because all the rotating components of the gas generator flow path according to the invention run at high and optimum specific speeds, the physical dimensions of the rotors become small and inexpensive to produce. Also, the inertia of the rotor assembly becomes small, which will facilitate quick starts.

The double-entry, first stage compressor will provide twice the mass flow compared with a single-entry compressor of comparable dimensions. Under steady state operating conditions when the air is compressed in the first stage to design levels, the flow path geometry of the latter will accommodate the entire first stage compressed gas flow rate. During start-up, however, and before the first stage volume flow is reduced to the design level, the second stage compressor cannot "swallow" the larger-than-designed-for volume flow.

Therefore, means are preferably provided for bleeding compressed air exiting the first compressor stage during start-up conditions, the bled air avoiding the second compressor stage. As embodied herein, and as depicted schematically in FIG. 1, bleed duct 76 is connected to cross-over duct 44 to receive compressed air from first compressor stage 14 when valve 78 is activated during start-up. Automatic controller 80 is shown controlling valve 78, but manual operation could be substituted for controller 80. One skilled in the art could readily select appropriate apparatus for providing the function of controller 80 given the present disclosure. The bled air can simply be discharged to the atmosphere as shown in FIG. 1.

There is a profound difference between the present invention and the known art. The configuration described with the absolute ranges of specific speeds, overall pressure ratio, and pressure ratio split between first and second stage compressors, coupled with a mechanically and aerodynamically matched drive element, namely the radial inflow gas generator turbine, provides an unexpected opportunity for the first time to obtain higher than 20:1 pressure ratio in a turbine engine below, e.g., 1000 hp. This opportunity has been completely overlooked by the entire aero engine and turbine industry as evidenced by a paper from the Rolls Royce European Symposium, entitled "Small Engine Technology," Philip G. Ruffles, Aeronautical Journal of the Royal Aeronautical Society, Jan/Feb 1984, where the highest anticipated pressure ratios for such engine sizes is in the 14:1–16:1 range.

Because of the high peripheral speed possible with the radial inflow turbine, for example, above about 700 m/s in the present invention, the stagnation temperature of the combustion gases impinging on the turbine blade tips 70a, and hence the metal temperature of the turbine, is much lower (about 100°–200° C. lower) than in an axial turbine stage exposed to the same nozzle inlet temperature. Thus, the high blade tip speeds of the radial inflow turbine in the present invention, which are dictated by the compressor requirements, actually provide an additional benefit in terms of lower metal temperatures. This enables higher turbine inlet temperatures to be used which, together with the high pressure ratio of the present invention, result in a very low specific fuel consumption. The high pressure ratio cycle of the present invention can provide high thermal efficiency at firing temperatures up to about 1200° C. with current materials without introducing cooling in the turbine rotor. At this temperature level all current axial turbines need cooling. When gas generators according to this invention utilize pressure ratios well above 20:1, it could be desirable to cool the radial turbine or to use non-metallic materials for the rotor, since the efficiency would be further improved. Cooling could also be applied in order to increase specific power even if thermal efficiency would not be improved.

As presently contemplated, the gas generator depicted in FIG. 1 would ideally operate with an overall pressure ratio of about 20:1; produce an equivalent shaft power of about 700 hp with about a 40 lb/sec. air flow and turbine inlet temperature of greater than about 2200° F.; have a thermal efficiency of about 35%; and use a gas generator turbine expansion ratio of about 5:1. Turbine rotor speed would be approximately 92,000 rpm equivalent to a turbine blade tip speed of about 750 m/sec. Importantly, the projected equivalent engine fuel consumption would be about 0.35–0.40 lb/hp/hr, which is comparable to gas generators in state-of-the-art recuperated gas turbine engines under development. The specific weight of engines using the present gas generator is only about 10% that of a comparable diesel engine.

Heretofore, the above-quoted thermal efficiencies were obtainable only in very large (e.g., >30,000 hp) gas turbine engines using axial components or in smaller power units using lower pressure ratios and employing recuperators/regenerators. Of course, Low speed diesel engines would exhibit better thermal efficiencies, but at a considerable penalty in terms of size and weight.

It will be apparent to those skilled in the art that various modifications and variations could be made in the gas turbine gas generator apparatus of the present invention without departing from the scope or the spirit of the invention.

What is claimed is:

1. A high efficiency, single spool gas turbine gas generator comprising:
    (a) compressor means for providing an overall pressure ratio of greater than about 15:1, said compressor means including:
        (i) a first stage, double-entry centrifugal air compressor having a pair of entrances and a common exit,
        (ii) a second stage, centrifugal air compressor positioned adjacent to said first stage compressor, said second compressor stage having an entrance that is flow-connected to said first stage common exit and also having a second stage exit, and
        (iii) a shaft assembly for mechanically interconnecting said first and said second stage for rotation at the same angular speed;
    (b) combustor means operatively connected to the second stage exit for receiving the compressed air and combusting fuel using the compressed air to generate combustion gases;
    (c) a single stage radial inflow turbine having an inlet and an outlet, said turbine being operatively connected directly to said shaft assembly drive and also being flow connected to said combustor means for receiving at said turbine inlet, and partially expanding, the combustion gases; and
    (d) exhaust means flow connected to said turbine outlet flro channeling the partially expanded combustion gases for further external work-producing expansion, and wherein (i) said first and said second compressor stages each having a configuration selected to provide a pressure ratio of said first compressor stage greater than about twice the pressure ratio of said second compressor stage, and (ii) said first and second compressor stages each having a configuration selected to exhibit a respective specific speed each greater than about 0.60 at about optimum efficiency.

2. The gas generator as in claim 1 wherein said first and said second compressor stages each having a configuration selected to exhibit a respective specific speed between about 0.65 and about 0.85 at about optimum efficiency.

3. The gas generator as in claim 1 wherein said first and second compressor stages have a configuration selected to provide an overall pressure ratio greater than about 20:1.

4. The gas generator as in claim 1 wherein said first compressor stage has a configuration selected to provide a pressure ratio between about 6:1 and about 9:1.

5. The gas generator as in claim 1 wherein said second compressor stage has a configuration selected to provide a pressure ratio between about 2:1 and about 4:1.

6. The gas generator as in claim 1 wherein substantially all the compressed air leaving said second stage compressor is received by said combustor means.

7. The gas generator as in claim 1 wherein said first and said second compressor stages are coaxial with said radial inflow turbine, and wherein said turbine has a configuration selected to provide a blade tip speed greater than about 700 m/s.

8. The gas generator as in claim 1 wherein said first stage double entry compressor has a configuration selected to exhibit an inducer tip relative entrance Mach number greater than about 1.4.

9. The gas generator as in claim 1 further including means for bleeding a portion of the compressed air exiting said first compressor stage during start-up conditions.

10. The gas generator as in claim 2 wherein said radial inflow turbine has a configuration selected to exhibit a specific speed between about 0.50 and about 0.75 at about optimum efficiency.

11. A gas turbine engine comprising the gas generator as in claim 1 in combination with a free power turbine.

12. The gas generator as in claim 1 wherein said radial inflow turbine has a configuration selected to exhibit a specific speed between about 0.50 and about 0.75 at about optimum efficiency.

13. A high efficiency, single spool gas tubine gas generator comprising:

(a) compressor means for providing an overall pressure ratio of greater than about 15:1, said compressor means including:

(i) a first stage, double-entry centrifugal air compressor having a pair of entrances and a common exit, (ii) a second stage, centrifugal air compressor positioned adjacent to said first stage compressor, said second compressor stage having an entrance that is flow-connected to said first stage common exit and also having a second stage exit, and (iii) a shaft assembly for mechanically interconnecting said first and second stage for rotation at the same angular speed;

(b) combustor means operatively connected to the second stage exit for receiving the compressed air and combusting fuel using the compressed air to generate combustion gases;

(c) a single stage radial inflow turbine having an inlet and an outlet, said turbine being operatively connected to directly drive said shaft assembly and also being flow connected to said combustor means for receivng at said turbine inlet, and partially expanding, the combustion gases; and (d) exhaust means flow connected to said turbine outlet for channeling the partially expanded combustion gases for further work-producing expansion, and wherein (i) said first and second compressor stages each have a configuration selected to provide a pressure ratio of said first compressor stage greater than about twice the pressure ratio of said second compressor stage, (ii) said first and second compressor stages each have a configuration selected to exhibit a respective specific speed between about 0.65 and about 0.85 at about optimum efficiency, and (iii) said radial inflow turbine has a configuration selected to exhibit a specific speed between about 0.50 and about 0.75 at about optimum efficiency.

14. The gas generator as in claim 13 wherein said first and second compressor stages each have a configuration selected to provide an overall pressure ratio greater than about 20:1.

15. The gas generator as in claim 13 wherein said first compressor stage has a configuration selected to provide a pressure ratio between about 6:1 and about 9:1.

16. The gas generator as in claim 13 wherein said second compressor stage has a configuration selected to provide a pressure ratio between about 2:1 and about 4:1.

17. A single spool, two-stage high performance compressor unit comprising:

a double-entry centrifugal compressor first stage;

a single-entry centrifugal compressor second stage; said second stage compressor being operatively connected to receive gas exiting said first stage compressor;

a shaft assembly for coaxially mounting both said first stage and said second stage compressor for dependent rotation at the same speed, and wherein (a) said first and second compressor stages have a configuration selected to provide an overall pressure ratio across the compressor unit greater than about 15:1, (b) said first and second compressor stages each have a configuration selected to provide a pressure ratio across said first compressor stage greater than about twice the pressure ratio across said second compressor stage, and (c) said first and second stage compressors each have a configuration selected to exhibit a specific speed greater than about 0.60 at about optimum efficiency.

18. The compressor unit as in claim 17 wherein said first and second compressor stages each have a configuration selected to exhibit a respective specific speed between about 0.65 to about 0.85 at about optimum efficiency.

19. The compressor unit as in claim 17 wherein said first and second compressor stages have a configuration selected to provide an overall pressure ratio greater than about 20:1.

20. The compressor unit as in claim 18 wherein said first and second compressor stages have a configuration selected to provide an overall pressure ratio greater than about 20:1.

21. The compressor unit as in claim 17 further including turbine means for driving both said first stage and said second stage compressor, said turbine drive means having a configuration selected to exhibit a specific speed from about 0.50 to about 0.75 at about optimum efficiency.

22. The compressor unit as in claim 21 wherein said turbine means specific speed falls in the range of from about 0.50 to about 0.75.

23. The compressor as in claim 17 further including turbine means for driving both said first stage and said second stage compressor, said turbine drive means being mounted on said shaft assembly for rotation at said same speed.

24. The compressor as in claim 17 further including turbine means for driving both said first stage and said second stage compressor, said turbine drive means being mounted on said shaft assembly for rotation at said same speed,
   wherein the turbine drive means includes a single stage radial inflow turbine being mounted on said shaft assembly for driving both said first stage and said second stage compressors at said same speed, and
   wherein said turbine has a configuration selected to exhibit a specific speed from about 0.50 to 0.75 at about optimum efficiency.

25. A jet engine having a gas generator as set forth in claim 1 in combination with an exit jet nozzle.

26. A gas turbine engine comprising:
   A. a gas generator component for producing a flow of gas from which significant pv work can be extracted, said gas generator component further comprising,
      (a) compressor means for providing an overall pressure ratio of greater than about 15:1, said compressor means including:
         (i) a first stage, double-entry centrifugal air compressor having a pair of entrances and a common exit,
         (ii) a second stage, centrifugal air compressor positioned adjacent to said first stage compressor, said second compressor stage having an entrance that is flow-connected to said first stage common exit and also having a second stage exit, and
         (iii) a shaft assembly for mechanically interconnecting said first and said second stage for rotation at the same angular speed;
      (b) combustor means operatively connected to the second stage exit for receiving the compressed air and combusting fuel using the compressed air to generate combustion gases;
      (c) a single stage radial inflow turbine having an inlet and an outlet, said turbine being operatively connected directly to said shaft assembly drive and also being flow connected to said combustor means for receiving at said turbine inlet, and partially expanding, the combustion gases; and
      (d) exhaust means flow connected to said turbine outlet for channeling the partially expanded combustion gases for further external work-producing expansion, and wherein
         (i) said first and said second compressor stages each having a configuration selected to provide a pressure ratio of said first compressor stage greater than about twice the pressure ratio of said second compressor stage, and
         (ii) said first and second compressor stages each having a configuration selected to exhibit a respective specific speed each greater than about 0.60 at about optimum efficiency.
   B. means separate from said gas generator shaft and flow connected to said exhaust means for extracting pv work from said partially expanded combustion gases.

* * * * *